US011159980B2

(12) United States Patent
Mishra et al.

(10) Patent No.: US 11,159,980 B2
(45) Date of Patent: *Oct. 26, 2021

(54) SIGNALING STORM REDUCTION FROM RADIO NETWORKS

(71) Applicant: Parallel Wireless, Inc., Nashua, NH (US)

(72) Inventors: Rajesh Kumar Mishra, Westford, MA (US); Steven Paul Papa, Windham, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,556

(22) Filed: Feb. 17, 2020

(65) Prior Publication Data
US 2020/0187048 A1 Jun. 11, 2020

Related U.S. Application Data

(63) Continuation-in-part of application No. 16/181,794, filed on Nov. 6, 2018, which is a continuation of (Continued)

(51) Int. Cl.
*H04W 28/02* (2009.01)
*H04W 8/22* (2009.01)
(Continued)

(52) U.S. Cl.
CPC ......... *H04W 28/0284* (2013.01); *H04L 47/12* (2013.01); *H04L 47/2433* (2013.01);
(Continued)

(58) Field of Classification Search
CPC ..... H04L 47/12; H04L 47/2433; H04L 47/32; H04L 47/6275; H04W 8/22;
(Continued)

(56) References Cited

U.S. PATENT DOCUMENTS 5,541,987 A * 7/1996 Topper ............... H04L 47/10
370/236
8,549,146 B2 10/2013 Stanisic et al.
(Continued)

FOREIGN PATENT DOCUMENTS

CN 102598729 A * 7/2012 ......... H04L 12/1403
CN 102598729 B * 12/2013 ............ H04M 15/66
(Continued)

*Primary Examiner* — Eric Nowlin
(74) *Attorney, Agent, or Firm* — Michael Y. Saji; David W. Rouille

(57) ABSTRACT

A method for signaling storm reduction is disclosed, comprising concentrating a plurality of signaling messages from a radio access network node to a core network node at a signaling concentrator; and processing the plurality of signaling messages with a mobile device identifier rule, at a rate equal to or greater than a line rate of a link from the radio access network to the signaling concentrator, wherein processing the plurality of signaling messages further comprises determining whether to drop each of the plurality of signaling messages.

14 Claims, 11 Drawing Sheets

Related U.S. Application Data application No. 14/806,594, filed on Jul. 22, 2015, now Pat. No. 10,123,232.

(60) Provisional application No. 62/027,716, filed on Jul. 22, 2014.

(51) Int. Cl.
| | |
|---|---|
| *H04L 12/851* | (2013.01) |
| *H04L 12/865* | (2013.01) |
| *H04L 12/823* | (2013.01) |
| *H04L 12/801* | (2013.01) |
| *H04W 28/12* | (2009.01) |
| *H04W 76/50* | (2018.01) |

(52) U.S. Cl.
CPC .......... *H04L 47/32* (2013.01); *H04L 47/6275* (2013.01); *H04W 8/22* (2013.01); *H04W 28/12* (2013.01); *H04W 28/0289* (2013.01); *H04W 76/50* (2018.02)

(58) Field of Classification Search
CPC ......... H04W 28/0284; H04W 28/0289; H04W 28/12; H04W 60/04; H04W 76/18; H04W 76/50

See application file for complete search history.

(56) References Cited

U.S. PATENT DOCUMENTS

| | | | | |
|---|---|---|---|---|
| 8,873,387 B2* | 10/2014 | Chan | .................... | H04W 76/18 370/230 |
| 9,450,983 B2* | 9/2016 | Huang | .................... | H04L 63/20 |
| 9,648,515 B2* | 5/2017 | Velev | .................... | H04W 28/12 |
| 2008/0043989 A1* | 2/2008 | Furutono | .................... | H04M 3/367 379/269 |
| 2011/0061061 A1* | 3/2011 | Chen | .................... | H04L 69/40 719/313 |
| 2012/0178457 A1* | 7/2012 | Liao | .................... | H04W 76/18 455/437 |
| 2013/0042011 A1* | 2/2013 | Sugizaki | .................... | H04Q 3/0045 709/227 |
| 2013/0155954 A1* | 6/2013 | Wang | .................... | H04W 76/27 370/328 |
| 2013/0167181 A1 | 6/2013 | Dixit et al. | | |
| 2014/0310418 A1 | 10/2014 | Sorenson, III et al. | | |
| 2014/0313889 A1* | 10/2014 | Jeong | .................... | H04W 28/0284 370/230 |
| 2014/0313908 A1 | 10/2014 | da Silva et al. | | |
| 2014/0341041 A1* | 11/2014 | Velev | .................... | H04W 4/70 370/236 |
| 2014/0369190 A1* | 12/2014 | Chan | .................... | H04L 47/24 370/230 |
| 2016/0014154 A1* | 1/2016 | Huang | .................... | H04W 12/086 726/1 |
| 2016/0286434 A1* | 9/2016 | Noldus | .................... | H04W 28/10 |
| 2016/0373304 A1 | 12/2016 | Sharma et al. | | |
| 2017/0093724 A1 | 3/2017 | Bansal et al. | | |
| 2018/0205574 A1 | 7/2018 | Radunovic et al. | | |
| 2018/0357086 A1 | 12/2018 | Kinsella et al. | | |

FOREIGN PATENT DOCUMENTS

| | | | | |
|---|---|---|---|---|
| CN | 108199978 A | * | 6/2018 | |
| CN | 109392007 A | * | 2/2019 | |
| WO | WO-2011110021 A1 | * | 9/2011 | ............. H04L 12/14 |

* cited by examiner

SIGNALING STORM REDUCTION FROM RADIO NETWORKS

CROSS-REFERENCE TO RELATED APPLICATIONS

This application is a continuation-in-part of, and claims priority under 35 U.S.C. § 120 to, U.S. patent application Ser. No. 16/181,794, titled "Signaling Storm Reduction from Radio Networks" and filed on Nov. 6, 2018, which itself is a continuation application of, and claims the benefit under 35 U.S.C. § 120 of, U.S. patent application Ser. No. 14/806,594, filed Jul. 22, 2015 and entitled "Signaling Storm Reduction from Radio Networks," which itself claims the benefit of priority under 35 U.S.C. § 119(e) of U.S. Provisional Patent Application No. 62/027,716, and filed Jul. 22, 2014, and entitled "Signaling Storm Reduction From Radio Networks," each of which are hereby incorporated by reference in its entirety for all purposes. In addition, this application incorporates the following applications by reference in their entirety: U.S. patent application Ser. No. 13/889,631, entitled "Heterogeneous Mesh Network and a Multi-RAT Node Used Therein," filed on May 8, 2013; U.S. patent application Ser. No. 14/034,915, entitled "Dynamic Multi-Access Wireless Network Virtualization," filed on Sep. 23, 2013; U.S. patent application Ser. No. 14/183,176, entitled "Methods of Incorporating an Ad Hoc Cellular Network into a Fixed Cellular Network," filed Feb. 18, 2014; and U.S. patent application Ser. No. 14/571,250, entitled "Virtualization of the Evolved Packet Core to Create a Local EPC," filed on Dec. 15, 2014. In addition, U.S. Patent Publication No. 20190364616 A1; U.S. patent application Ser. No. 16/733,947; and International Patent Publication No. WO2019209922 are also hereby incorporated by reference in their entirety.

BACKGROUND

Traditional telecommunications service networks separate the systems used for signaling and user data. This separation is intended to create redundancy and fault tolerance to data throughput constraints. However, with the growth of Long Term Evolution (LTE) networks, there have been many discussions and papers written about signaling storms. Signaling storms, as used herein, are events during which heavy traffic significantly reduces the signaling capacity of a network; they differ from ordinary network congestion in that it is limited signaling capacity, not limited data capacity, that is the constraint.

Why is signaling load growing to such an extent? One reason is the flatter architecture of LTE and 5G networks as compared with 3G networks. In 3G networks, the Radio Network Controller (RNC) resides between the base station and core network elements, effectively shielding the core network from the mass of signaling generated by the radio access network for mobility management. Because LTE and 5G use a flat architecture, it eliminates the RNC. The core network is connected directly to the base stations, which means that it has to handle all signaling traffic. All networks having a flat architecture are, to some extent, vulnerable to signaling overload in this way.

A corollary is that the failure of one element in the core network can have consequences for a large number of base stations and UEs. For example, a single home subscriber server (HSS) may provide identity services for all subscribers on the network, and may provide these services to hundreds of eNodeBs. As another example, a single mobility management entity (MME) can provide mobility management also for hundreds of eNodeBs. The failure of an MME can cause hundreds of mobile devices to become unable to access the network.

If a single HSS or MME fails, the consequences may include a signaling storm, as all eNodeBs and/or UEs connected to that HSS or MME may attempt to reconnect to another core network node at the same time, causing a spike in traffic similar to a denial-of-service attack.

SUMMARY

A number of solutions are disclosed herein for mitigating signaling storms.

In one embodiment, a method may be disclosed, including: concentrating a plurality of signaling messages from a radio access network node to a core network node at a signaling concentrator; and processing the plurality of signaling messages with a mobile device identifier rule, at a rate that may be a significant fraction of a line rate of a link from the radio access network node to the signaling concentrator, wherein processing the plurality of signaling messages further comprises determining whether to drop each of the plurality of signaling messages.

The plurality of signaling messages may include attach requests from a user device to connect to the core network. Using a user equipment (UE) profile for processing the plurality of signaling messages may be performed. Determining whether to drop, provide service to, or provide degraded service to each of the plurality of signaling messages may be performed. Determining whether to send a mobile device to another radio access network node may be performed. Determining whether each of the plurality of signaling messages may be a detach message and determining whether to provide service to the detach message may be performed. Concentrating signaling messages from a plurality of radio access network nodes may be performed. The signaling concentrator may include a user equipment (UE) profile generator. The radio access network node may be a eNodeB. The radio access network node may provide radio access according to 2G, 3G, 4G, or 5G protocols. Creating a user equipment (UE) profile using one of an international mobile subscriber identity (IMSI) and international mobile equipment identity (IMEI) may be performed. Sharing a user equipment (UE) profile or an eNodeB profile with a second signaling concentrator may be performed. Receiving a user equipment (UE) profile from a second signaling concentrator or a core network node may be performed. Receiving configuration information from an operations support system (OSS) node in the core network, the configuration information including user equipment (UE) profiles may be performed.

In another embodiment, a system may be disclosed, including: a signaling concentrator in communication with a plurality of base stations, further comprising: a processor configured to delay or drop at least some messages based on a device profile; a memory configured to store the device profile; a backhaul network connection communicatively coupled with a core network; a radio access network connection communicatively coupled with the plurality of base stations; and a device profile generator.

In another embodiment, a method may be disclosed, including: receiving a plurality of signaling messages from a plurality of mobile devices at a base station; receiving, from a coordinating node, signaling prioritization information, processing the plurality of signaling messages with a mobile device identifier rule by determining whether to drop each of the plurality of signaling messages using the signaling prioritization information, and forwarding a subset of the plurality of signaling messages to the coordinating node or to a core network.

The signaling prioritization information may include user equipment profiles. Rogue node profile creation may be performed at one of an eNodeB and a core network server.

In another embodiment, a method may be disclosed, including: receiving a plurality of signaling messages from at least one mobile device at a base station; characterizing the at least one mobile device using a user signaling profile as following a typical mobile device usage pattern or an atypical mobile device usage pattern; blocking signaling messages from a mobile device that have been characterized as atypical; and forwarding, to the coordinating node or to a core network, signaling messages from a mobile device that have been characterized as typical.

In another embodiment, a method may be disclosed, including: concentrating, at a signaling concentrator, a plurality of signaling messages from a radio access network node to a plurality of core network nodes in a plurality of core networks; and processing the plurality of signaling messages with a mobile device identifier rule, at a rate approximately equal to a line rate of a link from the radio access network to the signaling concentrator, wherein processing the plurality of signaling messages further comprises using configuration information specific to a target core network.

Processing the plurality of signaling messages may further comprise determining whether to drop each of the plurality of signaling messages.

In another embodiment, a method may be disclosed, including: receiving a plurality of signaling messages from a radio access network node at a signaling concentrator; applying a first priority level to each signaling message in a first subset of the plurality of signaling messages; applying a second priority level to each signaling message in a second subset of the plurality of signaling messages; forwarding each signaling message in the first subset to a core network; and determining whether to delay or drop at least one message in the second subset, wherein applying the first priority level and applying the second priority level may be performed based on a mobile device identifier rule.

Assigning a first delay to a first message in the first subset and a second delay to a second message in the second subset may be performed. Assigning a first message in the first subset to a first queue and assigning a second message in the second subset to a second queue, and forwarding each message in the first queue and selectively dropping at least one message in the second queue may be performed. Applying a first priority to messages from a first mobile device and applying a second priority to messages from a second mobile device may be performed. Applying a first scheduled time to messages from a first mobile device and applying a second scheduled time to messages from a second mobile device may be performed. Applying the mobile device identifier rule using one of an international mobile subscriber identity (IMSI) and international mobile equipment identity (IMEI) may be performed. Using load indicators of network nodes in the core network to perform prioritization may be performed. Applying the first priority level to messages sent from emergency services personnel may be performed.

Figure 1:
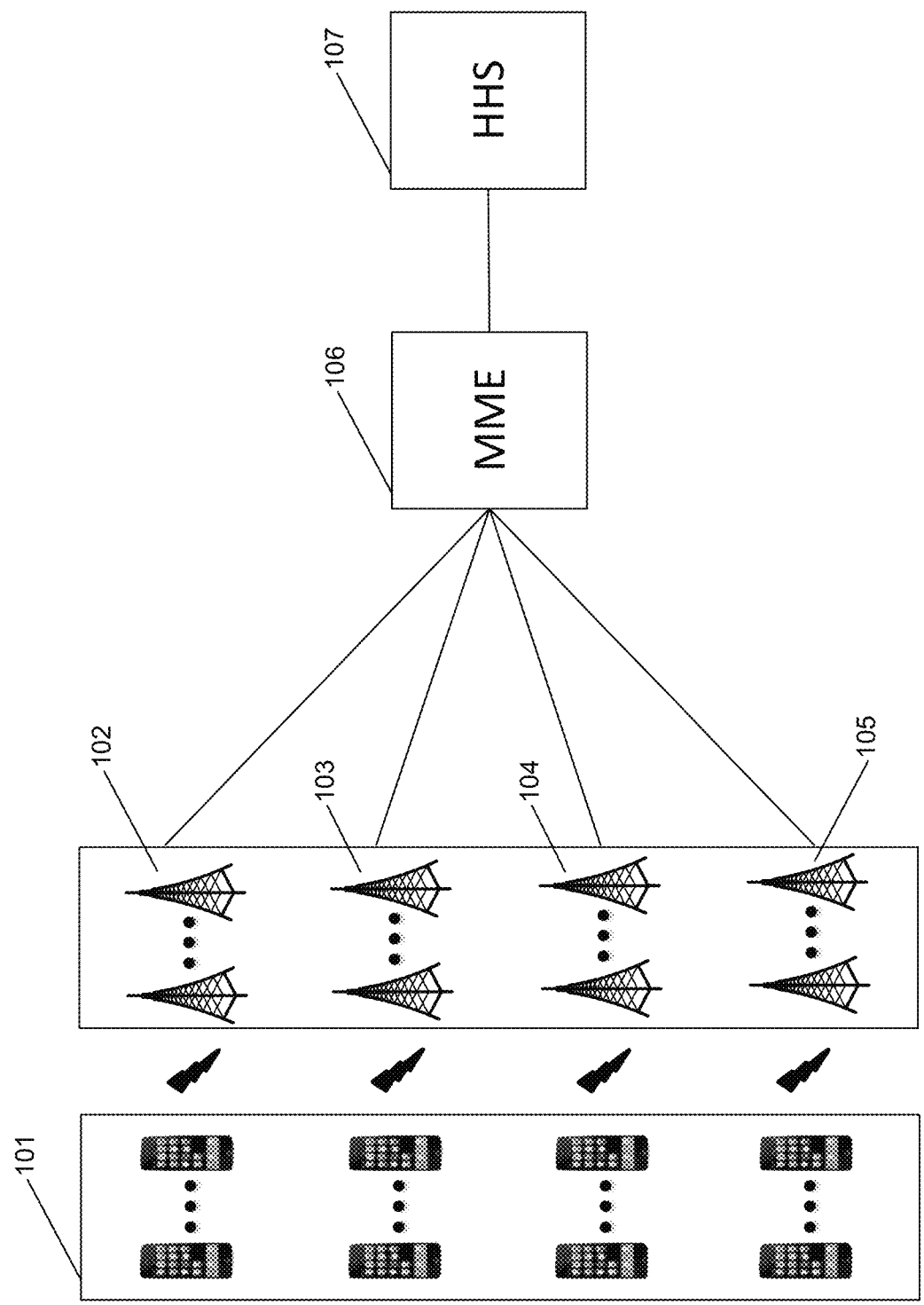
FIG. 1 is a schematic diagram illustrating a signaling storm in an operator network.

DETAILED DESCRIPTION 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G is a term loosely connected to a current generation of a radio access network and core network, and includes both a 5G radio access network (RAN) and a 5G core network. The 5G RAN is designed to interoperate together with the 4G (Long Term Evolution or LTE) RAN and core network. The 5G core network is also designed to interoperate with the 4G core network. Deployment of the 5G RAN in conjunction with the 4G core network is known as "non-standalone" or NSA. Deployment of the 5G RAN with the 5G core network and without the 4G core network is known as "standalone" or SA. Various combinations of 5G, including standalone and non-standalone and with other radio access networks, are contemplated by the $3^{rd}$ Generation Partnership Project (3GPP).

Noteworthy is that the 5G RAN contemplates the use of millimeter waves to provide additional bandwidth. Millimeter waves tend to have shorter range than microwaves, such that the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device. References to a UE also include a 5G UE, references to an eNode B also include a gNodeB and references to a core network also include a 5G core network.

Deployment of the present systems and methods in a 5G network is contemplated in both 5G SA and NSA core network modes, in some embodiments. When in 5G stand-alone mode, a signaling concentrator may be placed between the 5G RAN and the 5G core. When in 5G NSA mode, the signaling concentrator may be placed between the 5G RAN and the 4G core being used for NSA core support. The 5G signaling concentrator may also be colocated with a 4G signaling concentrator. The 5G signaling concentrator may provide stateful firewalling and stateful proxying of 5G protocols and interfaces. In NSA mode, a 4G signaling concentrator can be used to provide 5G signaling concentration support.

1. Service Request Throttling Per UE (Throttle, Deny, Pass Through)

In a first embodiment, service request throttling may be performed on a per-UE basis. In this approach, the rate of service requests from the UE are measured and based on a core network-configured threshold, and new requests from the UE are denied if the threshold is exceeded. In the LTE scenario, it is difficult to differentiate between service request types (control or data) to apply policies based on same. Typically, an operator is willing to give higher priority to avoiding signaling storm outages at the expense of user experience. In some embodiments, a signaling concentrator node is positioned between eNodeB and MMEs, thereby solving the signaling storm problem at the edge of the network as opposed to on the back-end or in the core of the network.

2. UE Disallowed Service at eNB, not in CN

In a second embodiment, service request throttling may be performed at the radio access network (RAN) itself, such as at an eNodeB, a NodeB, or a Wi-Fi access point, including at a multi-radio access technology (multi-RAT) access node. In this approach, a UE can be disallowed service at the eNB (CWS) itself if the number of service requests or IDLE/CONNECTED transactions exceed a certain threshold.

3. Rogue UE, RN, eNB Detection

In a third embodiment, detection of rogue user equipment (UE), relay node (RN), and eNodeB nodes may be provided, and once a rogue device is detected, the network may disallow the related attachment connection request. Detection of rogue UE can be based on pattern matching and/or deep packet inspection (DPI) heuristics/signatures/rules, which may be detected at a network node in the core network and which may be published by the operational support system (OSS). For example, the signature can be that of a certain specific application, e.g., the Facebook app, implemented on a certain particular device, such as, for example, the Apple iPhone 5S. In this embodiment, received signals from the suspected rogue UE could be compared to signature signals that are known to be authentic signals and signatures that are known to be rogue signals. Within a network, RANs may share information about signals that are known to be authentic or rogue with the computing cloud so that it can store this information in a centralized location.

4. MOCN Signaling Concentrator; Per-CN Security Behavior Based on Per-CN OSS

In a fourth embodiment, one signaling concentrator node can be used to serve multiple EPC cores, and hence core networks, in parallel. With the same signaling behavior, the signaling concentrator node could take different actions accordingly (throttle, deny or pass-through) based on the associated OSS tied with the particular EPC core.

5. Multi-Signaling Concentrator Correlated Joint Response

In a fifth embodiment, when there are a plurality of signaling concentrator nodes deployed and these nodes communicate with each other, they may cooperate. In this scenario, when one of the nodes has identified an ongoing malicious DDOS attack, it may signal other nodes in the region so that the other signaling concentrators can intensify their signaling storm action like throttling even though the signaling DDOS attack has not started on those sites.

6. Per-UE Signaling Priority.

In a sixth embodiment, once a signaling storm is detected, another action the network can take is prioritization. For example, heavy signaling load can be generated from UEs used by police, UEs used by the normal people and UEs tied with the machine. A signaling concentrator acting as a proxy can assign different priority and schedule higher priority signaling traffic accordingly during the signaling storm.

In some embodiments, the same or similar techniques, methods, architectures, and systems may be used to provide signaling storm reduction for 2G, 3G (including 3GPP and 3GPP2 technologies), and 5G technologies, in addition to and in conjunction with reduction for 4G and LTE technologies. 2G, 3G, and 5G technologies all have certain commonalities, such as handsets with IMSI, IMEI or other hardware identifiers, that can be used in conjunction with the techniques described herein. In some embodiments, the techniques described herein could be applied to communications networks that include Wi-Fi gateways, such as ePDG, HRPD, or TWAG gateways, in communication with a centralized mobility server or authorization server, such as enterprise-managed telephone networks. In some embodiments, the techniques described herein could be applied to communications networks that include pico cells, femto cells, small cells, or other cellular base stations that are operated at a lower radio power and for fewer users than a macro cell.

In some embodiments, the techniques described herein could be applied to communications networks that include cells on wheels (COWs) and other temporary cellular installations, or other mobile or vehicle-mounted base stations, such as those described in U.S. Pat. No. 8,867,418, which is hereby incorporated by reference in its entirety; in fact, such temporary and mobile cellular nodes may have additional utility in the event of an emergency, and would be well-suited to be used together with the techniques described herein.

An example of a typical signaling storm scenario follows. Today it is common for many users to receive the same notification at once, such as a notification from Facebook that an update or message is available. If a large number of users are sent the same notification, the notification originates on a server on the Internet and is sent to a core network server via a packet gateway, such as an LTE PGW. The core network server then must identify the target user and find the user on the network, even if the user's UE is turned off. The core network may initiate tens or hundreds of paging requests to find these UEs, which may overload the network. Next, in the common situation that the UEs are not already attached with an active data session, each UE may initiate an attach request and request a data bearer, which, given enough users, may result in a signaling storm at the core network that exceeds the maximum signaling throughput or maximum processing throughput of the network, or both. A scale factor also similarly multiplies the load on a network-wide resource, such as an HSS, that is provisioned for typical load conditions and not for extreme burst load conditions.

Given that a single eNodeB may be overwhelmed by a large number of requests, the corresponding upstream MME will be subject to a scale factor of the cumulative requests from several eNodeBs, and may also be likely to fail when handling all of these requests. In today's networks, failure modes of MMEs and other network nodes are unpredictable, and may result in partially-completed attach protocols, a "zombie" attach that does not permit the attached user to receive or send data, or even complete non-responsiveness. Other users, including users that are already attached, may also experience non-responsiveness, delay, or involuntary detach.

In some embodiments, signaling messages may be received, aggregated, and concentrated by filtering at a signaling concentrator network node, as described further herein. The signaling concentrator network node may process the signaling messages at a rate sufficient to handle the messages it receives. One measure of signaling message throughput is the line rate. The line rate, sometimes defined as the physical layer net bit rate or effective data rate, is the number of bits that physically pass through the physical layer connection, minus bits used for error-correcting codes in some definitions. When a signaling storm occurs, the signaling throughput can approach this maximum physical layer rate. However, since the signaling throughput cannot exceed this rate, signaling storms can be handled by provisioning a system that can handle messages at or near this rate.

In some embodiments, provisioning a signaling concentrator for signaling storms may be performed by adding together the backhaul line rates of each eNodeB or base station coupled to the signaling concentrator, and providing compute resources sufficient to handle signaling messages received at or approaching the theoretical line rate. The signaling concentrator may use the mobile device identifier to apply a scheduling profile, which can indicate whether a given message should be passed on to the core network, delayed, provided with degraded service, or dropped. Although the signaling concentrators may additionally use any of the methods and techniques described herein, this subset of functionality is sufficient to enable the line rate processing of signaling, thereby avoiding signaling storms.

In some embodiments, if a single concentrator is not sufficient, multiple concentrators may be provided in a distributed network of signaling concentrators, each processing its own signaling messages. The load may be divided by source base station, physical RAN connection, or by mobile device identifier (e.g., IMSI), or by time slice, or by any other method. In the event that multiple concentrators are used, each may have its own cache of mobile device identifier scheduling profiles, which may be assumed to be updated only when there is no active signaling storm. Scheduling profiles may be created at another network node and distributed to the signaling concentrator nodes.

In other embodiments, if the signaling traffic at line rate is projected to exceed the capacity of one or more signaling concentrators, a queue may be put into place where the size of the queue is equal to the line rate of the underlying base stations, multiplied by the projected duration of a signaling storm or disaster outage. The queue can help ensure that signaling messages are not dropped for the length of the projected duration, and can reduce the effective line rate, thereby enabling a network operator to reduce the required hardware for the signaling concentrator.

In some embodiments, local evolved packet core (local EPC) or local core network functionality may be provided, either at the signaling concentrator node or at the eNodeBs themselves. In the event of a signaling storm, it is possible that a node may lose its connectivity to the core network. Indeed, it is possible that a natural disaster or other emergency situation may be the cause of the signaling storm, which also may affect the availability of the core network. Therefore, a local EPC may be provided.

The local EPC enables certain functionality to be performed according to the techniques described herein, without requiring access to the core network. Specifically, the local EPC may cache authentication and policy information from one or more core network HSS servers, OSS servers, or AAA servers. Many of the techniques described within require mobile device identifier profiles. The local EPC may download these profiles from the abovementioned core network servers. The local EPC may also download and cache core network authentication credentials for some or all mobile device identifiers (e.g., IMSI), so that when a mobile device connects to the network, it is able to authenticate and attach even without core network connectivity at attach time. In some embodiments, mobile devices that fail to authenticate with the cached credentials in the absence of connectivity to the core network may be provided degraded signaling and data connections as described elsewhere herein, until connectivity to the core network is restored.

In some embodiments, a core network-wide policy may be promulgated by a server, such as an operations support system (OSS) server. The OSS server may promulgate policies for one core network or more than one core network (e.g., for a multi-operator core network, or MOCN). The OSS server may take into account information about natural disasters in the region, sports events, scheduled or unscheduled service outages, and other situations that may result in an increased likelihood of a signaling storm. Such information may also be provided by and/or shared with one or more nodes in the network, with or without an OSS server, in some embodiments. The network-wide policy may be applied to a plurality of eNodeBs, a plurality of coordination nodes which may be signaling concentrators, or both.

In some embodiments, stateful filtering techniques may be used. A stateful firewall is a firewall that, in addition to performing inspection of packets being transmitted via the firewall in isolation, keeps track of the state of network connections traveling across it. For example, a stateful firewall can identify when a network connection has been made, and will pass packets related to that connection, but will deny other packets that are not part of any known active connection. In the context of the disclosure herein, stateful filtering may be used at a network node to identify spurious signaling messages from network nodes, including mobile devices and UEs as well as core network nodes, that are not part of a known active connection and that are not valid attach messages. Such spurious signaling messages may be identified by keeping track of the attach state and bearer state of each UE being serviced by the network node. The network node may be the eNodeB itself, or it may be a coordination node being used as a signaling concentrator node, or both.

Stateful filtering may use IMEI or IMSI, or may use IP address and port, protocol type (TCP, UDP, SCTP, etc.), protocol information at various levels, including application-layer protocols (HTTP, DNS, etc.), security and encryption status, GTP tunnel status, and the like to perform filtering. Stateful filtering may also maintain and track protocol state for standard 3GPP protocols such as attach protocols and bearer establishment protocols, in order to, for example, reject and filter duplicate or spurious messages that are not expected as part of a particular protocol-specific signaling flow. Deep packet inspection may be used as needed to provide any information needed for state monitoring and tracking.

In some embodiments, proxy functionality in the filtering network node may be used to maintain state to be used for filtering, such as by maintaining an S1 proxy, an X2 proxy, or another type of proxy at the network node for an eNodeB. The state information being used at the network node may be shared with other network nodes for performing filtering of the same UE's flows at other points in the network, or for general UE characterization purposes to develop profiles of typical traffic. State may be maintained for some UEs or for all UEs, and may be maintained indefinitely, maintained for a configurable set time, maintained until network load has diminished, or maintained until manually purged, among other potential alternative embodiments.

In some embodiments, the methods and techniques described herein may be applied in situations where one or more mobile devices (e.g., UEs) have active circuit-switched voice calls, data bearers, or data calls (i.e., VOIP or VOLTE). In such situations, the state of the active calls may be maintained at one or more nodes, and this state can be used to ensure that signaling for any of these active calls is permitted to pass through unfiltered.

In some embodiments, fingerprinting and profiling of unusual or anomalous signaling may be performed. Methods for fingerprinting network traffic, such as those described in, e.g., U.S. Pat. Nos. 8,474,043 and 8,656,493, hereby incorporated by reference in their entirety, may be used to identify which signals are expected and which signals are anomalous. For example, a set of rules may be created, either a priori, based on 3GPP protocols, or based on observation of a training corpus of data, defining what should be considered ordinary or normal traffic. The rule-based system may define, for example, that an attach message should be followed by certain other messages, such as a bearer setup message, according to the 3GPP protocol. The resulting set of rules may then be used as a rule tree, to match any signaling messages that are received at a node in the network. Messages that are not part of a sequence of messages encoded in the rule tree can be flagged as anomalous. Once one or more anomalous messages have been flagged, the network node may examine other messages from the same UE and potentially filter them. Fingerprinting may be performed on live data, or on training data, or both, in some embodiments.

In some embodiments, certain types of activity may be flagged as anomalous, including: a number of attach or detach requests above a flooding threshold and within a certain time; a sequence of attach requests to more than one eNodeB within a certain time; a sequence of attach requests to the same eNodeB without completing the attach sequence within a certain time; a sequence of mobility registration requests within a certain time; unusual upload activity; unusual download activity; activity indicating a port scan of network resources; activity on a particular set of ports previously identified as belonging to a rogue UE or anomalous node; and other activities. In some embodiments, IMSI, IMEI, operating system, operating system version, browser, browser version, app name, app version, protocols at various layers, including application-layer protocols (e.g., HTTP, VOLTE), IP address, or other parameters may also be considered in determining whether a UE is anomalous or a rogue node.

In some embodiments, rogue mobile device detection may be complemented by detection of rogue eNodeBs, rogue base stations, and rogue relay nodes according to the same methods.

In some embodiments, signaling messages sent from a mobile device may be subject to being dropped (i.e., denying service), being delayed (degraded service), or being forwarded according to the specification, which during a signaling storm may constitute priority service. If a signaling message, such as an attach message, is denied or degraded, data service for that mobile device generally will be denied or degraded as well as a result. In some embodiments, various additional options may be offered for degraded service, as follows.

In some embodiments, attach messages may be degraded by permitting a mobile device to attach, but by then not permitting the mobile device to establish a data connection (e.g., bearer or tunnel) with the core network ("zombie attach"). This has the result of temporarily reducing signaling from the mobile device, as it will not re-request an attach. In some embodiments, a mobile device may be permitted to attach, and may subsequently be permitted to establish a data connection with a restricted, capped, or throttled bandwidth. The throttling may be put in place temporarily by a policy at a core network node, such as a signaling concentrator, a mobility management entity (MME), a serving gateway (SGW), or a packet gateway (PGW). Throttling may permit a large number of users to send and receive urgent text messages in an emergency situation. The throttling may be subsequently removed.

In some embodiments, data connections for a given mobile device may be terminated and the resulting capacity used to establish a data connection with another mobile device. In some embodiments, circuit-switched connections but not data connections, or vice versa, or VOLTE bearers but not regular LTE data bearers, or vice versa, may be provided for a given mobile device. In some embodiments, an attach message may be degraded by the mobile device being directed to connect to another base station on another radio access technology (inter-RAT transfer). For example, if a mobile device is attempting to connect to a heavily-loaded 4G cell, a signaling concentrator may direct the 4G cell to send the mobile device to a nearby 3G cell. In some embodiments, emergency calls only may be permitted.

FIG. 1 is a schematic diagram illustrating a signaling storm in an operator network. A large number of user equipments (UEs) 101 are each contributing to a signaling storm, causing a series of eNodeBs to be overloaded. Here, eNodeB group 102, eNodeB group 103, eNodeB group 104, and eNodeB group 105 all suffer the consequences of the signaling storm. Each eNodeB handles many UEs. Mobility management entity (MME) 106 handles mobility for all UEs attached to each of eNodeBs 102, 103, 104, 105. Normally, under non-overload, non-signaling storm conditions, MME 106 is able to handle mobility and signaling for all UEs in a timely fashion. However, when all UEs are requesting service at the same time, MME 106 is saturated and is unable to handle servicing all UEs in a timely fashion. Saturation of MME 106 may occur as a result of saturated signaling bandwidth; saturated backhaul bandwidth; overloaded processing capacity; too many threads active at the MME; or for a variety of other reasons. MME 106 is in communication with home subscriber server (HSS) 107. HSS 107 is responsible for providing authentication information for a UE that desires to attach to the network. However, when MME 106 is overloaded, it may send partial or malformed requests to HSS 107, further causing overload. HSS 107 may also be responsible for other parts of the network (not shown), and as it begins to slow down, it may negatively affect those other parts of the network also.

Figure 2:
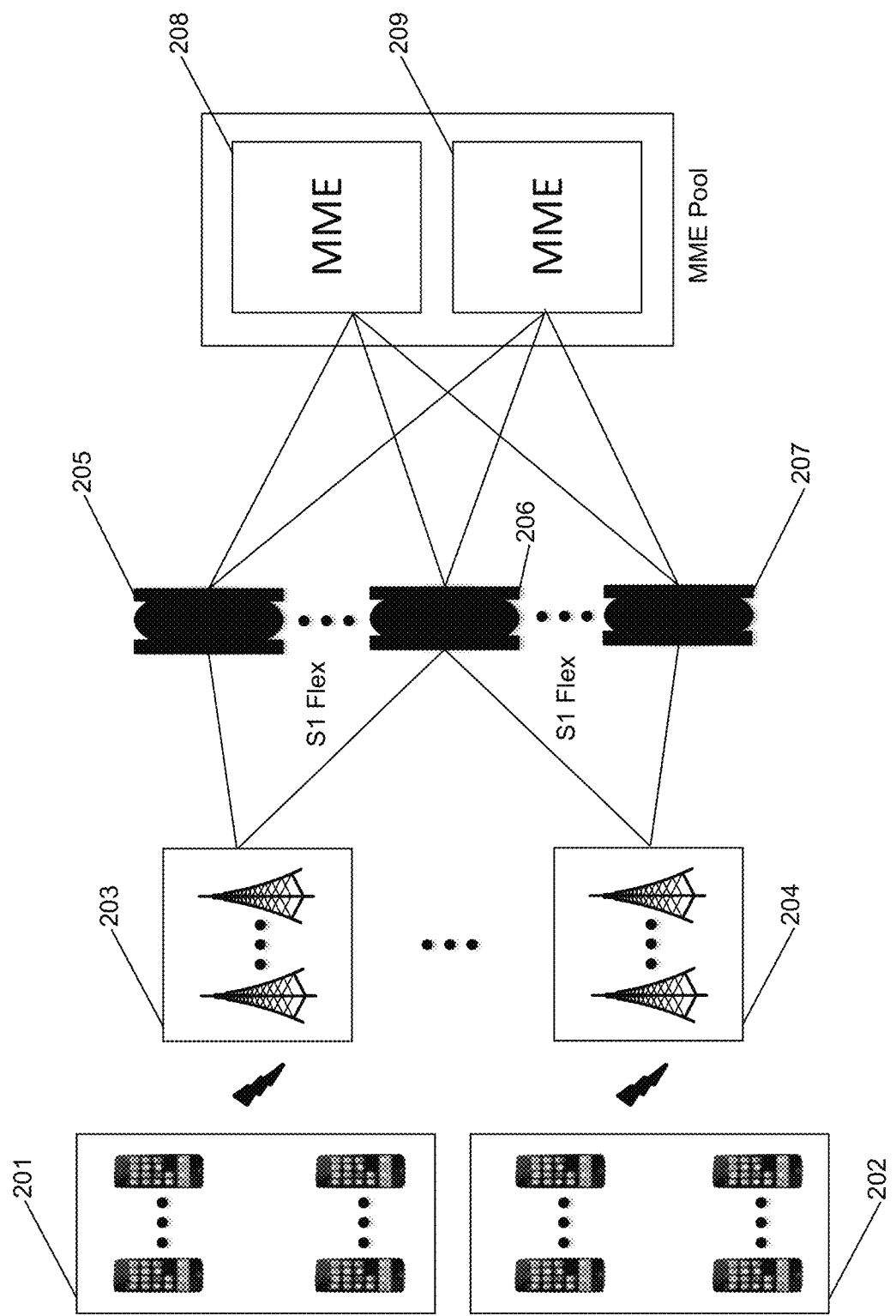
FIG. 2 is an architecture diagram illustrating a multi-RAN, multi-MME network with a series of signaling concentrator nodes, in accordance with some embodiments.

FIG. 2 is an architecture diagram illustrating a multi-RAN, multi-MME network with a series of signaling concentrator nodes, in accordance with some embodiments. UEs 201 are attached to eNodeB group 203. UEs 202 are attached to eNodeB group 204. The eNodeB group 203 is connected, via the S1-Flex protocol, to signaling concentrator nodes 205 and 206. The eNodeB group 204 is connected, via the S1-Flex protocol, to signaling concentrator nodes 206 and 207. Signaling concentrator nodes 205, 206, and 207 are connected, via the S1-Flex protocol, to a pool of MMES that includes MME 208 and MME 209, which provides access to the core network for the concentrator nodes and also all the eNodeBs and UEs connected through the concentrator nodes. Note that the architecture is intended to scale, with dots in the diagram showing where additional eNodeB groups may be present and may be coupled to additional concentrator nodes.

The concentrator nodes 205, 206, 207 each act to receive, and to thereby concentrate, signaling messages from eNodeBs 203 and 204. Once the concentrator nodes have received these signaling messages, they can then process them before passing them onto MMES 208, 209. By performing processing and applying policies to the messages, the concentrator nodes can prevent MMES 208, 209 from becoming overloaded; thus, this functionality can be thought of as a firewall between the eNodeBs and the core network. By processing incoming messages at a rate substantially equal to the line data rate from the eNodeBs, the concentrator nodes can themselves avoid becoming overloaded.

The concentrator nodes 205, 206, 207, each with this firewall capability, may work together to protect the core network. As shown in the diagram, eNodeBs 203 are in communication with both concentrator 205 and concentrator 206. If one of the concentrators is becoming overloaded, it may request help from a neighbor, or may request that an eNodeB use a different concentrator, or may create a direct forwarding path to another concentrator, in some embodiments. The firewall they provide is thus a distributed firewall. Other distribution mechanisms are within the skill of a practitioner in the art.

One way that the concentrator nodes provide their firewall capability is by providing proxy capability. The concentrator nodes 205, 206, 207 each maintain a state machine for each eNodeB and for each core network they are connected to. In some cases, it may be advantageous to proxy the plurality of eNodeBs 203 to appear to the MMEs as a single eNodeB (which is made possible by using the standard S1 or S1-Flex protocol). This reduces signaling even further, and protects the MME from a signaling storm. The resultant overhead is handled by the concentrator node in its state machine. This may be thought of as a virtualization layer or as analogous to a network address translation layer. This may also be thought of as providing stateful firewall capability, as described further herein.

Figure 3:
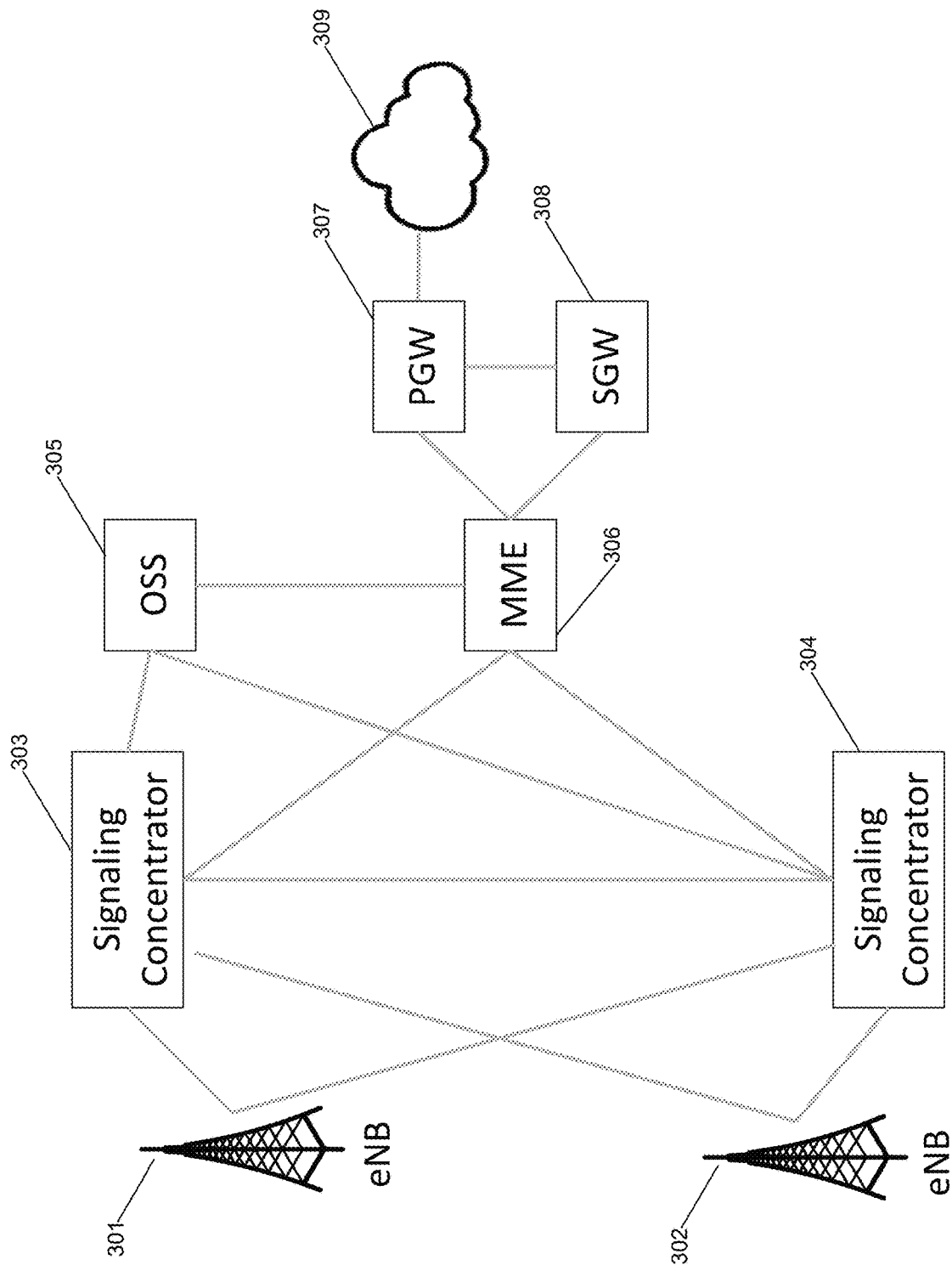
FIG. 3 is an architecture diagram illustrating a multi-RAN network with a series of signaling concentrator nodes and a core network, in accordance with some embodiments.

FIG. 3 is an architecture diagram illustrating a multi-RAN network with a series of signaling concentrator nodes and a core network, in accordance with some embodiments. eNodeB 301 is coupled to signaling concentrators 303 and 304. eNodeB 302 is also coupled to signaling concentrators 303 and 304. Signaling concentrators 303 and 304 are coupled to each other, enabling them to share profiles and signaling message processing loads. Signaling concentrators 303 and 304 are also each connected to the core network, specifically, to an operational support system (OSS) 305 and an MME 306. OSS 305 is typically used in the core network by a network operator for setting policies. Here, the OSS can be used as a source of prioritization policies for signaling concentrators 303 and 304. For example, signaling from IMEIs that are not authorized to be on the network at all will be dropped. OSS 305 may have access to historical data in the core network, and this information may be leveraged to create policies. At the signaling concentrators, relevant policies may be retrieved by searching on IMEI or IMSI, which provides a quick method for applying relatively granular policies. Alternatively, policies may be based on specific eNodeBs, or on a particular type of traffic, or on patterns of traffic at a particular time, or based on traffic that exceeds a threshold, such as a threshold for too many attaches within a certain time period. MME 306 is used by the core network to track and manage mobility of UEs. Here, signaling concentrators 303 and 304 act as distributed stateful firewalls for protecting MME 306 from signaling load and signaling storms. In the depicted diagram, MME 306 is connected to packet gateway 307 and serving gateway 308, which provide access to network services such as phone calls and the public Internet 309. In the depicted architecture, concentrators 303 and 304 perform the function of examining signaling messages and determining whether they should be forwarded, dropped, or delayed, and are thereby able to protect OSS 305 and MME 306 from signaling storms at the edge of the network, without unduly burdening the core network.

Figure 4:
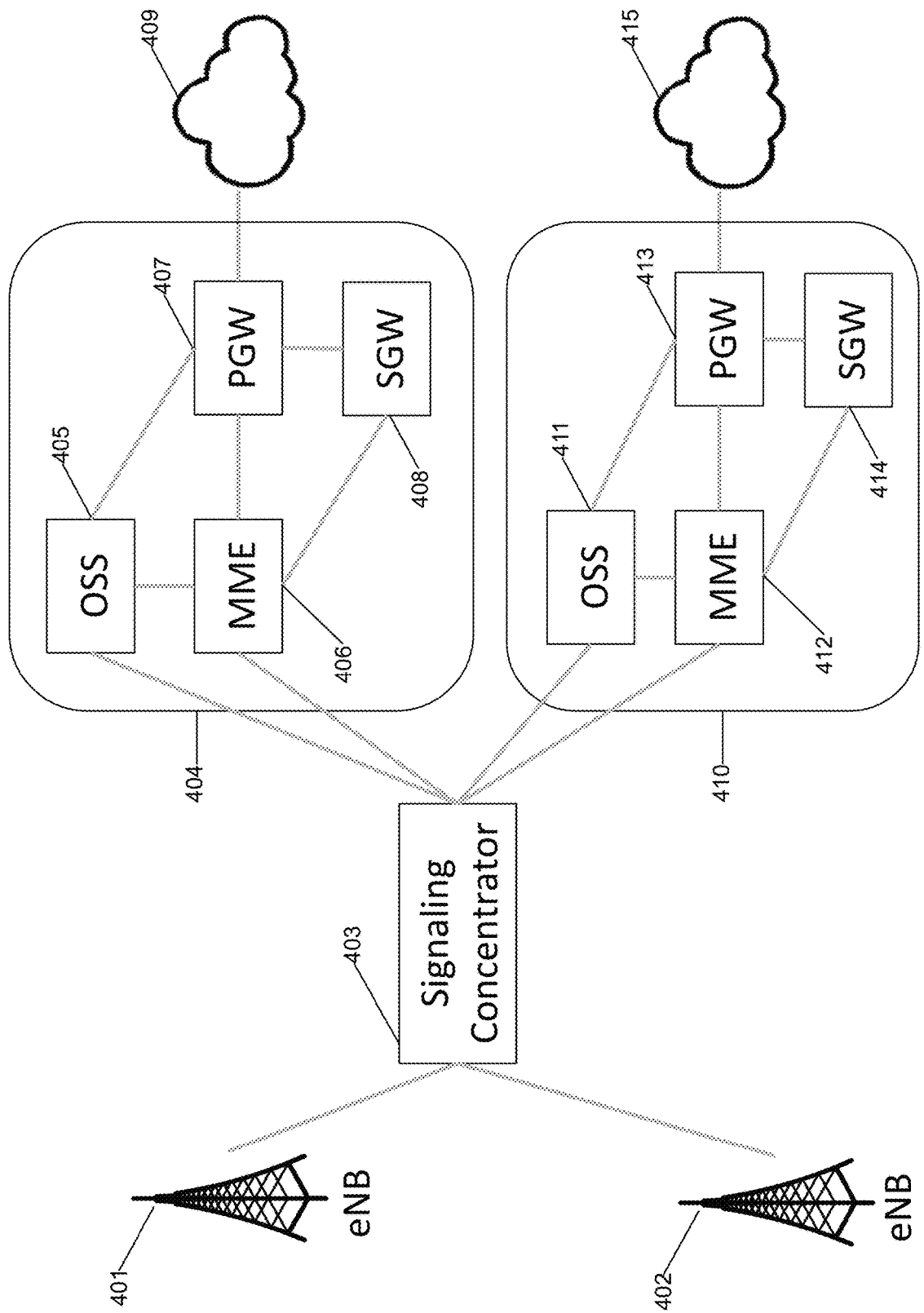
FIG. 4 is an architecture diagram illustrating a multi-RAN network with a signaling concentrator node and multiple operator core networks, in accordance with some embodiments.

FIG. 4 is an architecture diagram illustrating a multi-RAN network with a signaling concentrator node and multiple operator core networks, in accordance with some embodiments. eNodeBs 401 and 402 are coupled to signaling concentrator 403. Signaling concentrator 403 is coupled to both core network 404 and core network 410. Core network 404 includes OSS 405, MME 406, PGW 407, and SGW 408. Core network 410 includes OSS 411, MME 412, PGW 413, and SGW 414. Packet gateway 407 provides access for core network 404 to Internet provider 409. Packet gateway 413 provides access for core network 410 to Internet provider 415. Note that signaling concentrator 403 is coupled to both an OSS and an MME in each core network.

In FIG. 4, the signaling concentrator node examines signaling messages from eNodeBs 401 and 402, and determines whether they should be forwarded, dropped, or delayed. Signaling concentrator 403, however, is able to apply policies that apply to communications targeting one or the other core network. Signaling concentrator 403 may first separate the communications by target network, and may then apply policies for that network. Alternatively, signaling concentrator 403 may cache a mapping of IMSIs to their respective core networks, and then may use IMSI to identify the appropriate core network for policies. Alternatively, one or both core networks may be searched for policies that apply to a given IMSI, and one or both policies may be applied. Signaling concentrator 403 may cache or retain some or all of the policies used by one or both of the core networks.

In some embodiments, a pool of signaling concentrator nodes may be used instead of a single server. Using a pool, the performance of the signaling concentrator can be provisioned to exceed the combined line rate of the connections between eNodeBs 401 and concentrator 403, and between eNodeB 402 and concentrator 403.

Figure 5:
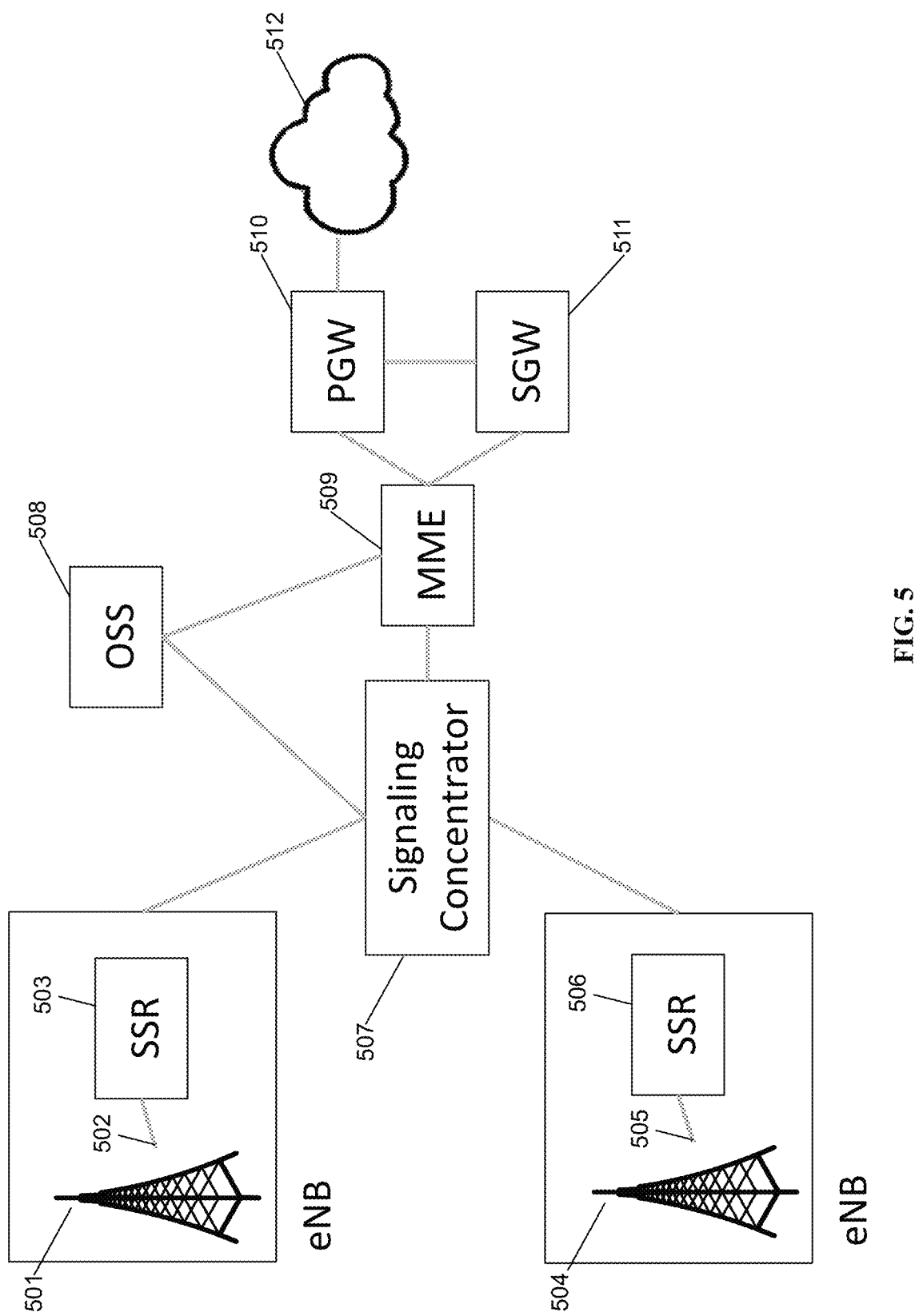
FIG. 5 is an architecture diagram illustrating a network in which the signaling storm reduction functionality is located at both the RAN and at a signaling concentrator node, in accordance with some embodiments.

FIG. 5 is an architecture diagram illustrating a network in which the signaling storm reduction functionality is located at both the RAN and at a signaling concentrator node, in accordance with some embodiments. Enhanced eNodeBs 501 and 504 each include a regular eNodeB 502, 505 and a signaling storm reduction (SSR) module 503, 506. The remainder of the architecture is as described above with respect to a single core network. Signaling concentrator 507 is coupled to both enhanced eNodeBs 501 and 504. Signaling concentrator 507 is also coupled to OSS 508 and MME 509. MME 509 is coupled to PGW 510 and SGW 511. PGW 510 is the gateway to the public internet 512.

In some embodiments, some or all of the functions of signaling concentrator 507 may be provided by SSR modules 503 and 506. Policies may be cached at the SSR modules. The SSR modules may also determine whether to delay, drop, or forward signaling messages from UEs attached to their individual eNodeBs. In some embodiments, the functions of signaling concentrator 507 may also be provided at signaling concentrator 507, such that multiple levels of signaling storm suppression are in place. Caching and distribution of authentication information, prioritization policies, and other information may be performed on a scheduled basis, in some embodiments, and may be restricted to information about UEs that are associated with a particular eNodeB based on historical records, in some embodiments.

Figure 6:
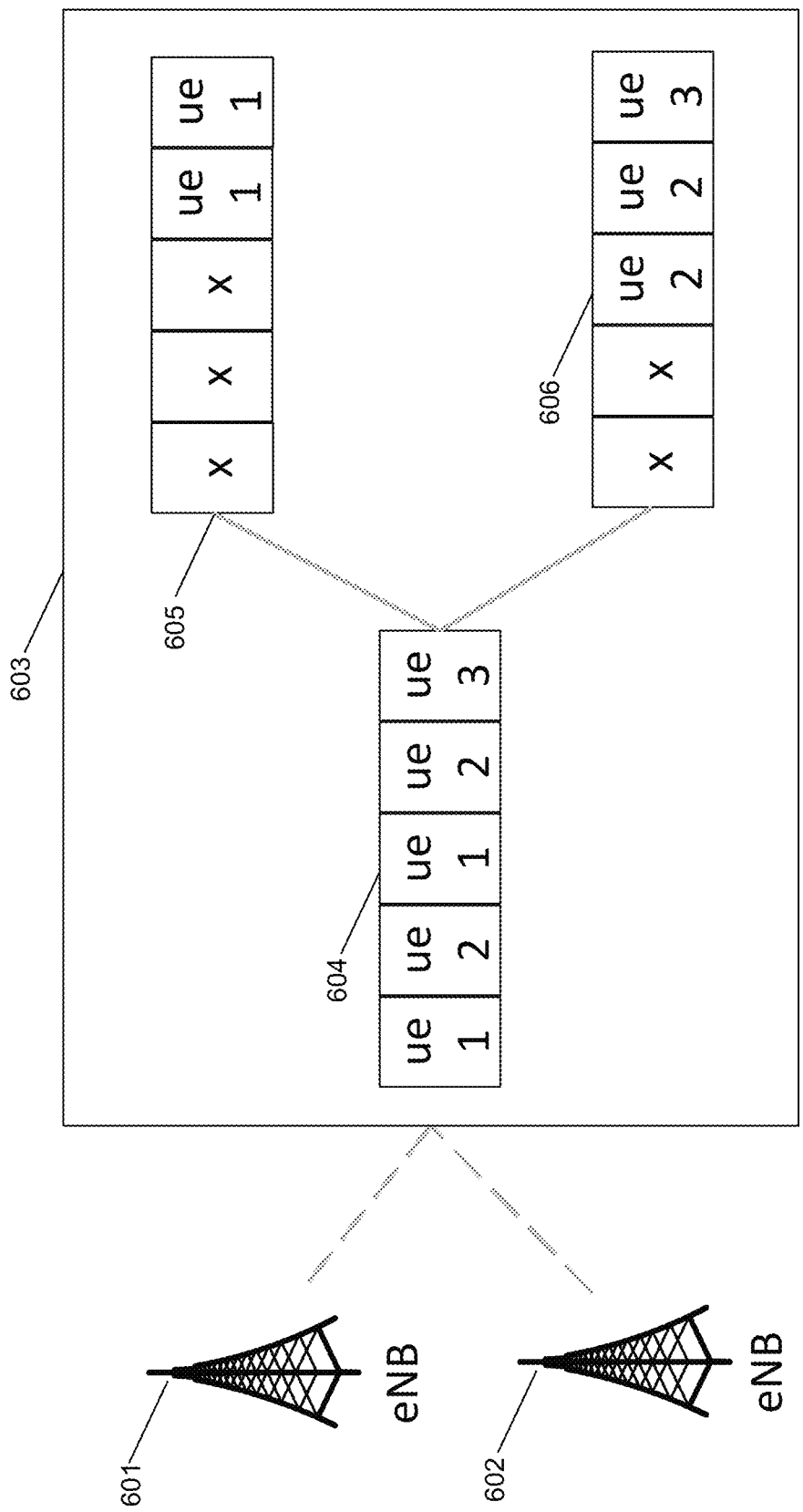
FIG. 6 is a schematic diagram illustrating a prioritization scheme, in accordance with some embodiments.

FIG. 6 is a schematic diagram illustrating a prioritization scheme, in accordance with some embodiments. eNodeBs 601 and 602 send signaling messages to signaling concentrator 603; the signaling messages are requests from, in this figure, three UEs: UE1, UE2, and UE3. Signaling concentrator 603 includes an input queue 604, a first priority queue 605, and a second priority queue 606. Input queue 604 includes all messages received at the signaling concentrator and may be ordered in FIFO order. The input queue is not sorted by UE or by priority. A process that takes messages off of input queue 604 may identify the IMSI being used in each of the messages, and may search for policies that apply to that UE or message. Based on policies, some messages may be sent to higher-priority queue 605 and others may be sent to lower-priority queue 606. Various types of policies may be applied, as described elsewhere herein.

In some embodiments, higher-priority queue 605 may be processed by simply forwarding each message in the queue to the core network. In other words, the signaling concentrator is not interfering with the messages in the queue. In some embodiments, if proxying is necessary it may be performed for the messages in the higher-priority queue. Here, messages from UE1 are directed to higher-priority queue 605. Turning to the lower-priority queue, the signaling concentrator may individually process each message again to determine if the messages are subject to policies, in some embodiments. Some messages may be delayed, or may remain in the queue, or may be dropped. If the higher-priority queue overflows, messages may be redirected to the lower-priority queue; if the lower-priority queue overflows, messages may be dropped, in some embodiments. In some embodiments, if any queue overflows, the system may take additional steps to drop messages, under the logic that overflowing queues mean that a signaling storm is underway.

Figure 7:
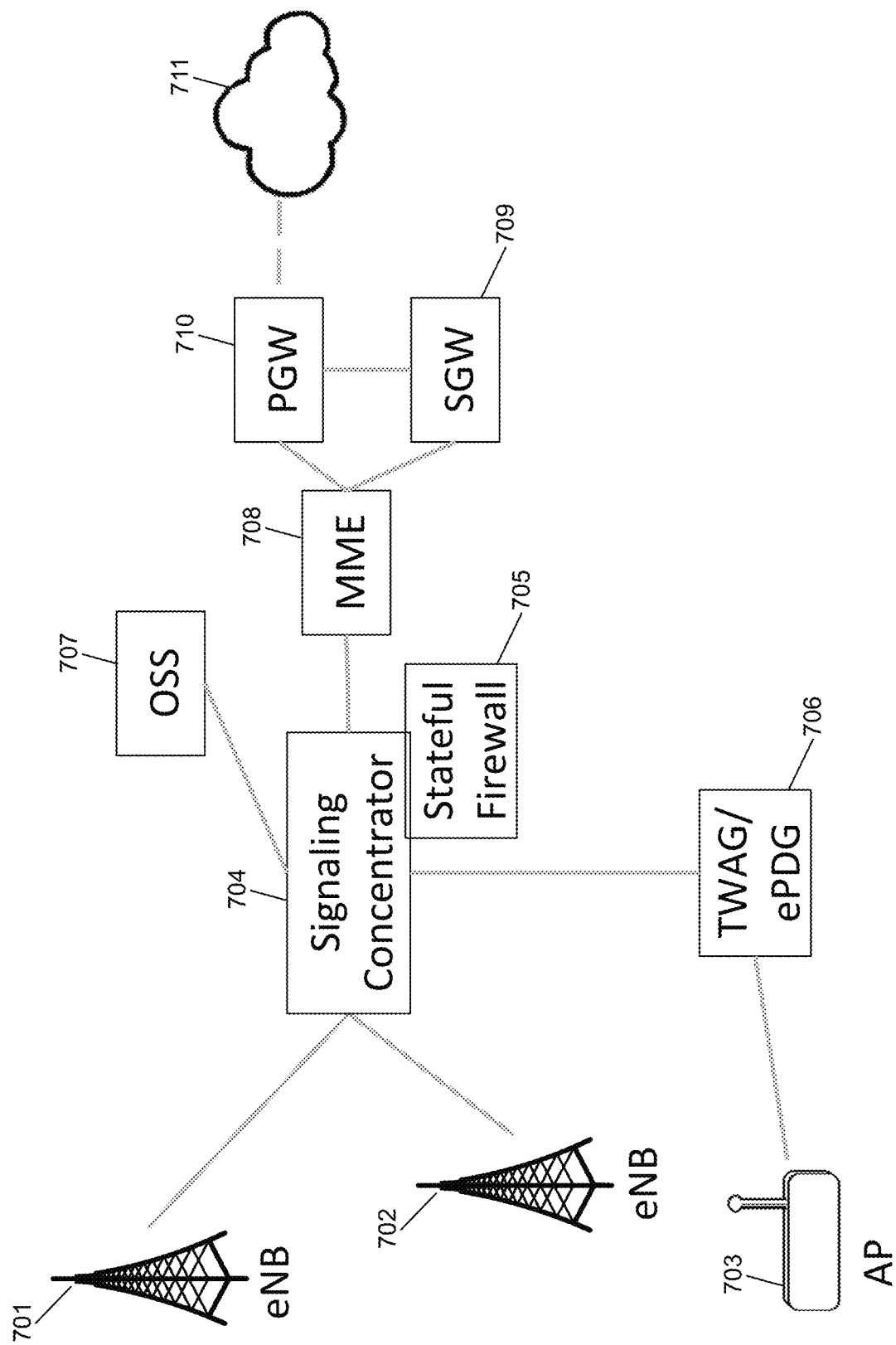
FIG. 7 is an architecture diagram showing a signaling concentrator and stateful firewall providing signaling storm reduction in a multi-RAT environment, in accordance with some embodiments.

FIG. 7 is an architecture diagram showing a signaling concentrator and stateful firewall providing signaling storm reduction in a multi-RAT environment, in accordance with some embodiments. eNodeB 701, NodeB 702, and Wi-Fi access point 703 provide access to various users using various radio access technologies. Each of the access RANs 701, 702, 703 is coupled to signaling concentrator 704 (the Wi-Fi access point 703 via TWAG/ePDG 706). Signaling concentrator 704 may provide filtering of signaling messages for all the different radio access technologies. For the examples shown, the signaling messages will be 3GPP protocol messages, and can be handled using the same architecture.

Figure 8:
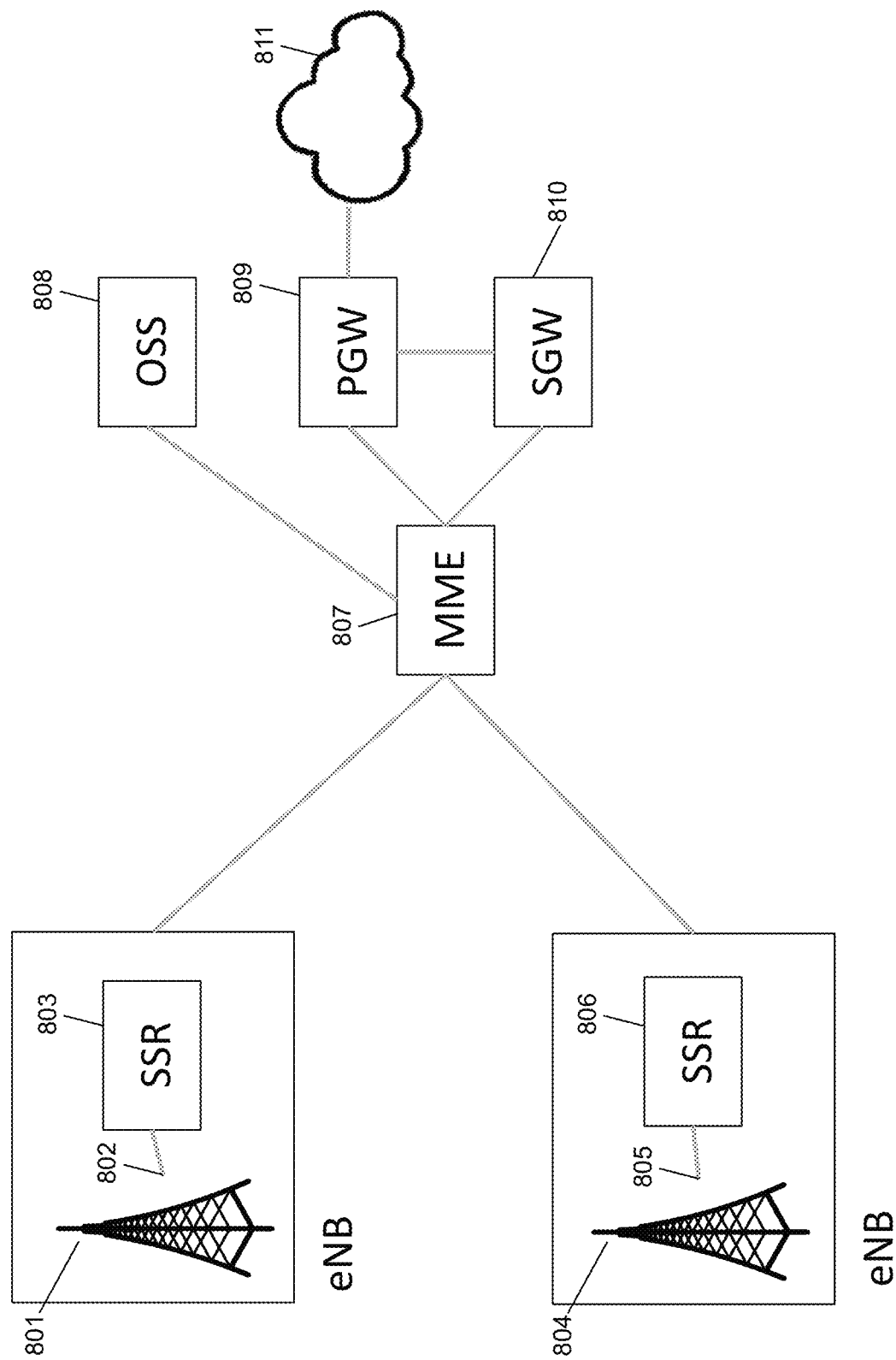
FIG. 8 is an architecture diagram illustrating a network in which the signaling storm reduction functionality is located at the RAN, in accordance with some embodiments.

FIG. 8 is an architecture diagram illustrating a network in which the signaling storm reduction functionality is located at the RAN, in accordance with some embodiments. Enhanced eNodeB 801 includes eNodeB 802 and signaling storm reduction module 803. Enhanced eNodeB 804 includes eNodeB 805 and signaling storm reduction module 806. SSRs 803 and 806 function as described above in the section relating to FIG. 5. Unlike in FIG. 5, there is no signaling concentrator module, and enhanced eNodeBs 801 and 804 communicate directly with the core network in the form of MME 807, which interfaces with OSS 808, PGW 809, SGW 810, and through PGW 809, the Internet 811. Even without a signaling concentrator node, a RAN-based signaling storm reduction module may provide advantageous reduction of signaling, in some embodiments.

Figure 9:
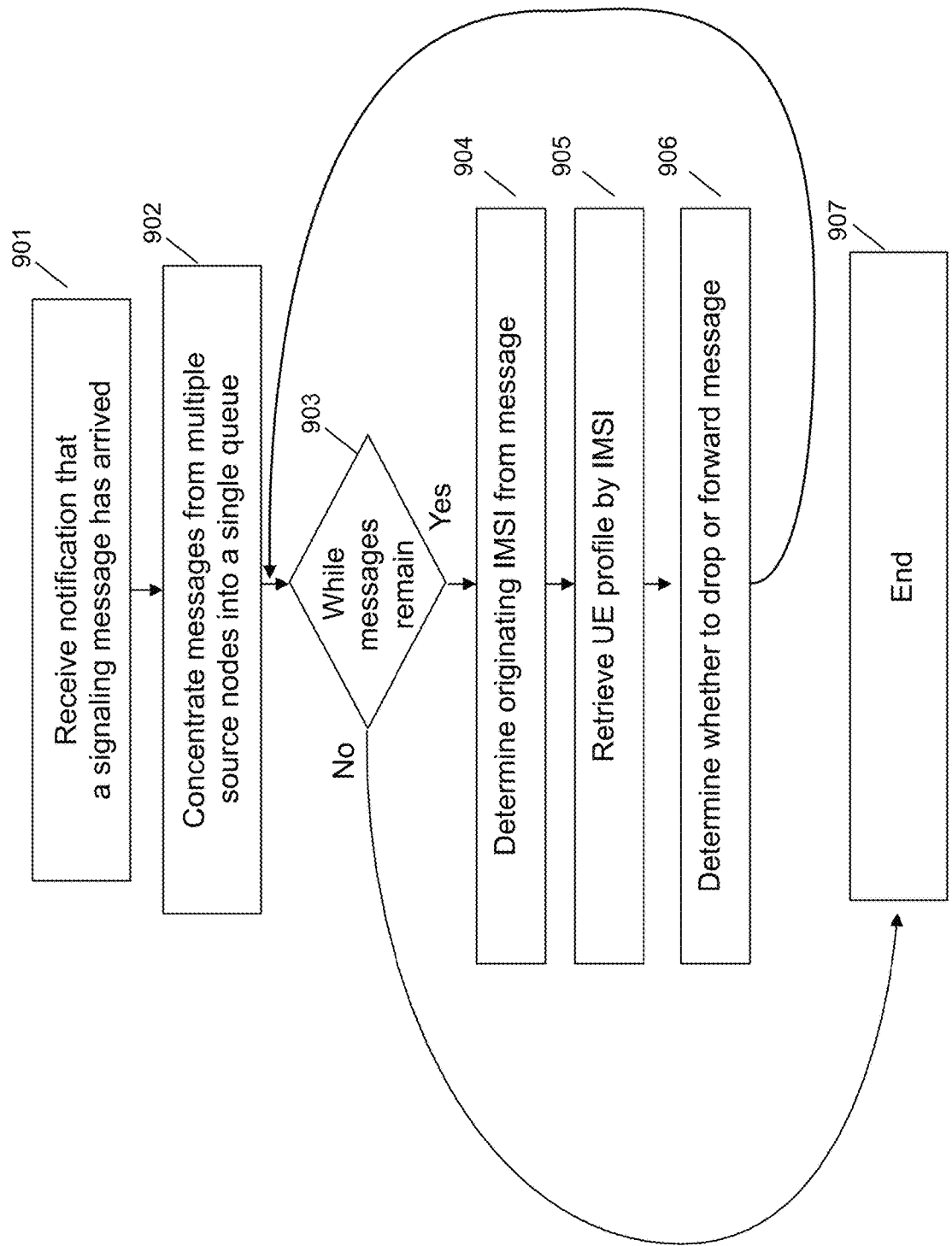
FIG. 9 is a flowchart illustrating a process for prioritizing signaling messages, in accordance with some embodiments.

FIG. 9 is a flowchart illustrating a process for prioritizing signaling messages, in accordance with some embodiments. The method described herein may be used at either the signaling concentrator or at a RAN equipped with an SSR module. At step 901, the system determines that one or more signaling messages have arrived. At the next step, if more than one downstream connection is being aggregated at the processing node, the other potential source nodes may be polled, and any messages received may be aggregated into a single queue. The single queue may be sorted by arrival time, or unsorted. At step 903, the queue is processed one message at a time. Each message is examined to determine the originating IMSI, at step 904. At step 905, a priority profile is retrieved based on the IMSI. If other profiles are active and would potentially apply to the message as well, those profiles may also be activated at this time. At step 906, the profiles are applied to this message, and this message is dispatched (e.g., either forwarded, dropped, or enqueued in another queue, in some embodiments). Processing continues at the next message until all messages have been processed, step 907.

Figure 10:
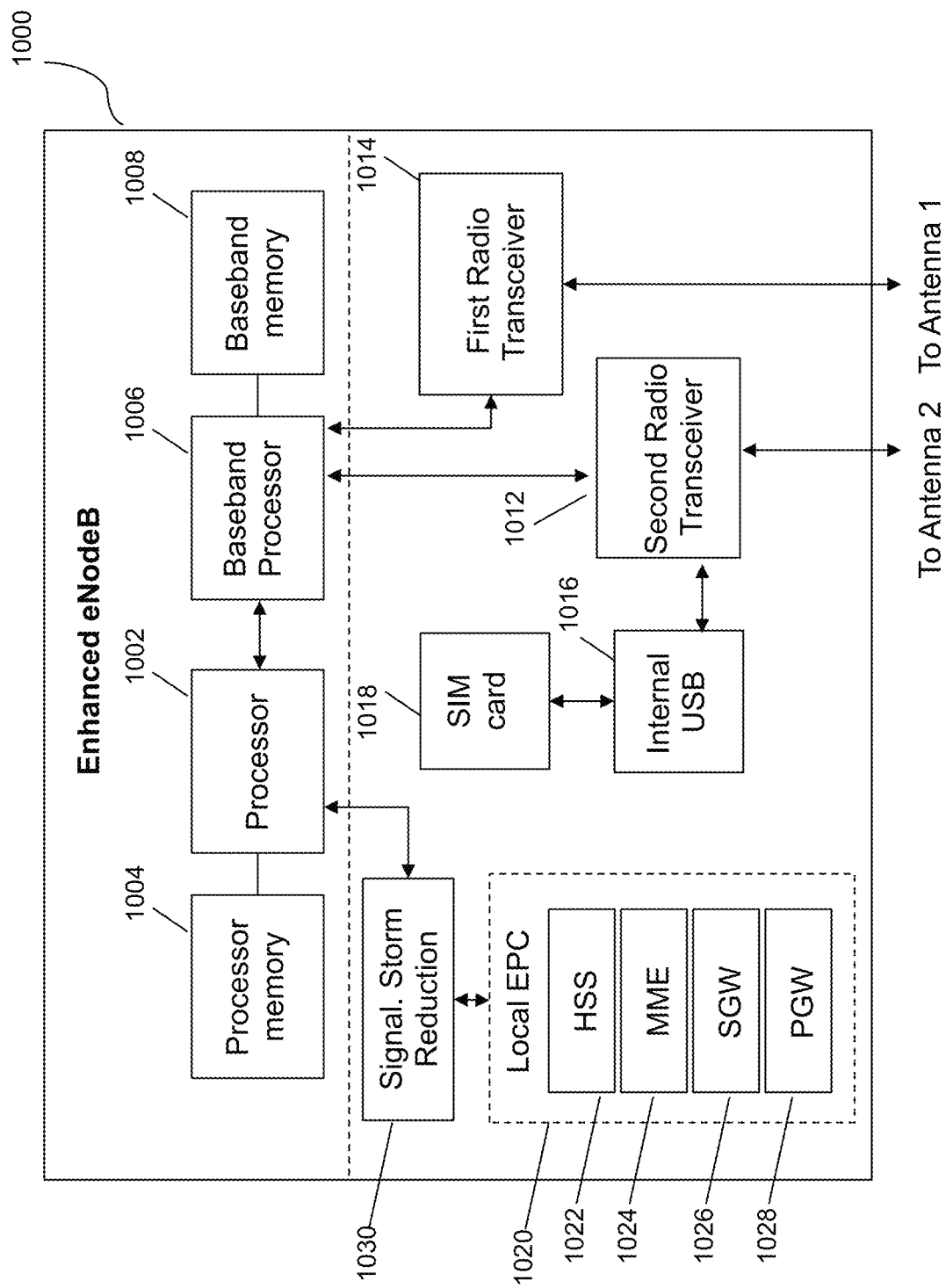
FIG. 10 is a schematic diagram of an enhanced eNodeB, in accordance with some embodiments.

FIG. 10 is a schematic diagram of an enhanced eNodeB, in accordance with some embodiments. Enhanced eNodeB 1000 may include processor 1002, processor memory 1004 in communication with the processor, baseband processor 1006, and baseband processor memory 1008 in communication with the baseband processor. Enhanced eNodeB 1000 may also include first radio transceiver 1010 and second radio transceiver 1012, internal universal serial bus (USB) port 1016, and subscriber information module card (SIM card) 1018 coupled to USB port 1014. In some embodiments, the second radio transceiver 1012 itself may be coupled to USB port 1016, and communications from the baseband processor may be passed through USB port 1016.

A signaling storm reduction module 1030 may also be included, and may be in communication with a local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. SSR module 1030 and local EPC 1020 may each run on processor 1002 or on another processor, or may be located within another device.

Processor 1002 and baseband processor 1006 are in communication with one another. Processor 1002 may perform routing functions, and may determine if/when a switch in network configuration is needed. Baseband processor 1006 may generate and receive radio signals for both radio transceivers 1010 and 1012, based on instructions from processor 1002. In some embodiments, processors 1002 and 1006 may be on the same physical logic board. In other embodiments, they may be on separate logic boards.

The first radio transceiver 1010 may be a radio transceiver capable of providing LTE eNodeB functionality, and may be capable of higher power and multi-channel OFDMA. The second radio transceiver 1012 may be a radio transceiver capable of providing LTE UE functionality. Both transceivers 1010 and 1012 are capable of receiving and transmitting on one or more LTE bands. In some embodiments, either or both of transceivers 1010 and 1012 may be capable of providing both LTE eNodeB and LTE UE functionality. Transceiver 1010 may be coupled to processor 1002 via a Peripheral Component Interconnect-Express (PCI-E) bus, and/or via a daughtercard. As transceiver 1012 is for providing LTE UE functionality, in effect emulating a user equipment, it may be connected via the same or different PCI-E bus, or by a USB bus, and may also be coupled to SIM card 1018.

SIM card 1018 may provide information required for authenticating the simulated UE to the evolved packet core (EPC). When no access to an operator EPC is available, local EPC 1020 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 1000 is not an ordinary UE but instead is a special UE for providing backhaul to device 1000.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 1010 and 1012, which may be Wi-Fi 802.11a/b/g/n/ac/ad/ah, Bluetooth, ZigBee, microwave (including line-of-sight microwave), or another wireless backhaul connection. Any of the wired and wireless connections may be used for either access or backhaul, according to identified network conditions and needs, and may be under the control of processor 1002 for reconfiguration.

Other elements and/or modules may also be included, such as a home eNodeB, a local gateway (LGW), a self-organizing network (SON) module, or another module. Additional radio amplifiers, radio transceivers and/or wired network connections may also be included.

Processor 1002 may identify the appropriate network configuration, and may perform routing of packets from one network interface to another accordingly. Processor 1002 may use memory 1004, in particular to store a routing table to be used for routing packets. Baseband processor 1006 may perform operations to generate the radio frequency signals for transmission or retransmission by both transceivers 1010 and 1012. Baseband processor 1006 may also perform operations to decode signals received by transceivers 1010 and 1012. Baseband processor 1006 may use memory 1008 to perform these tasks.

Figure 11:
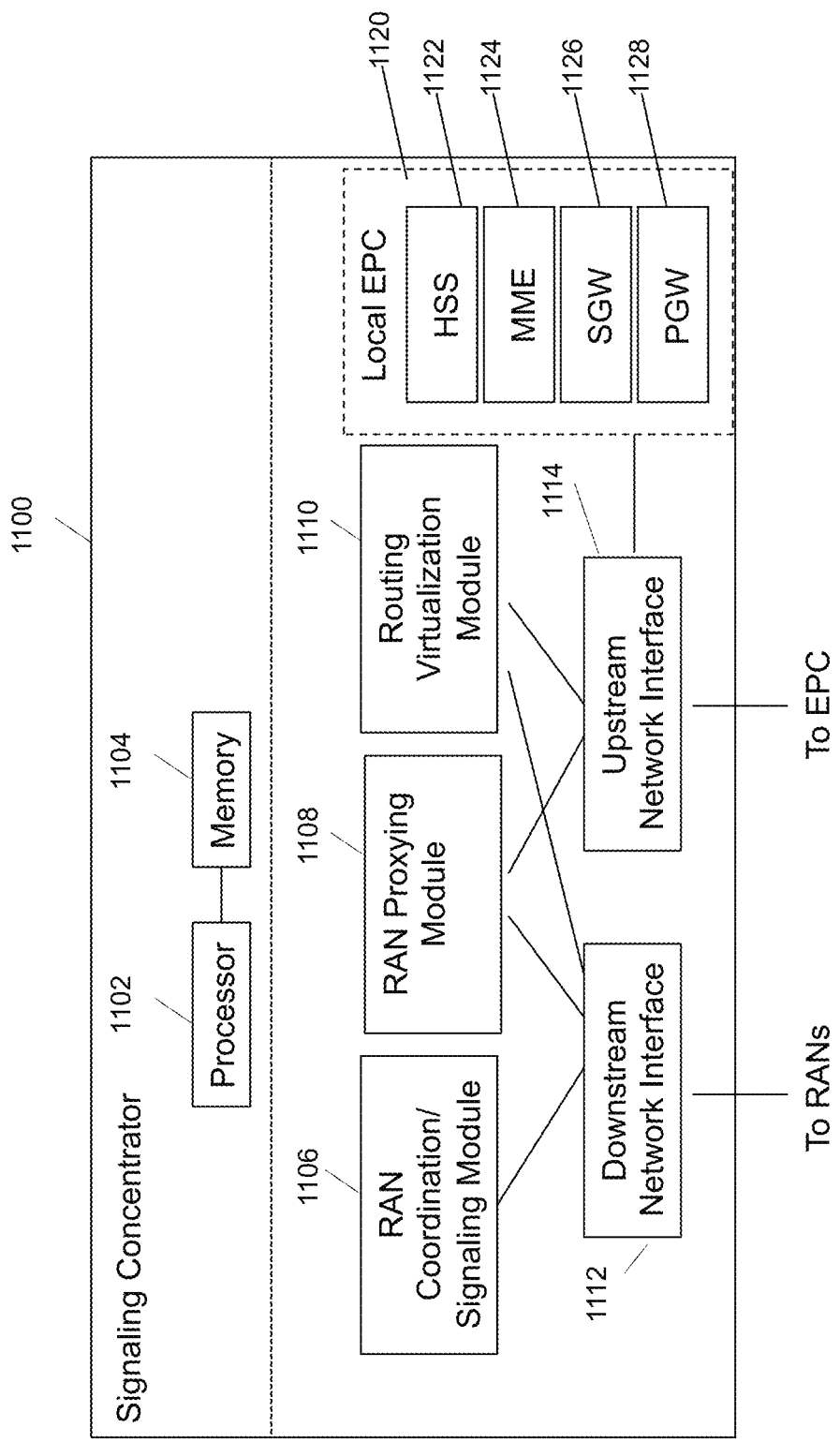
FIG. 11 is a schematic diagram of a signaling concentrator server, in accordance with some embodiments.

FIG. 11 is a schematic diagram of a signaling concentrator server, in accordance with some embodiments. Signaling concentrator 1100 includes processor 1102 and memory 1104, which are configured to provide the functions described herein. Also present are radio access network coordination/signaling (RAN Coordination and signaling) module 1106, RAN proxying module 1108, and routing virtualization module 1110. In some embodiments, concentrator server 1100 may coordinate multiple RANs using coordination module 1106. In some embodiments, coordination server may also provide proxying, routing virtualization and RAN virtualization, via modules 1110 and 1108. In some embodiments, a downstream network interface 1112 is provided for interfacing with the RANs, which may be a radio interface (e.g., LTE), and an upstream network interface 1114 is provided for interfacing with the core network, which may be either a radio interface (e.g., 5G or LTE) or a wired interface (e.g., Ethernet). Signaling storm reduction functions may be performed in module 1106.

Signaling concentrator 1100 includes local evolved packet core (EPC) module 1120, for authenticating users, storing and caching priority profile information, and performing other EPC-dependent functions when no backhaul link is available. Local EPC 1120 may include local HSS 1122, local MME 1124, local SGW 1126, and local PGW 1128, as well as other modules. Local EPC 1120 may incorporate these modules as software modules, processes, or containers. Local EPC 1120 may alternatively incorporate these modules as a small number of monolithic software processes. Modules 1106, 1108, 1110 and local EPC 1120 may each run on processor 1102 or on another processor, or may be located within another device.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one or more of IEEE 802.11a/b/g/n/ac. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G-compatible networks, LTE-compatible networks, to UMTS-compatible networks, to Wi-Fi networks, or to networks for additional protocols that utilize radio frequency data transmission. In particular, the inventors have appreciated that 5G networks are flat networks that are suitable for the deployment of a signaling concentrator or aggregation node as discussed throughout in the present application, having the same advantages as described herein. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Accordingly, the disclosure of the present invention is intended to be illustrative of, but not limiting of, the scope of the invention, which is specified in the following claims.

The invention claimed is:

1. A method of performing service request throttling in a Radio Access Network (RAN), comprising:
   determining a core network-configured threshold for a rate of service requests from a wireless device;
   determining a threshold for IDLE/CONNECTED transactions;
   measuring the rate of service requests from the wireless device;
   measuring the amount of IDLE/CONNECTED transactions from the wireless device; and
   taking an action regarding new service requests from the wireless device when the threshold for a rate of service requests is exceeded or when the threshold for IDLE/CONNECTED transactions is exceeded, wherein the wireless device comprises a User Equipment (UE) or an Internet of Things (IoT) device.

2. The method of claim 1 wherein taking an action regarding new service requests from the wireless device when the threshold for a rate of service requests is exceeded comprises denying new service requests from the wireless device.

3. The method of claim 1 wherein taking an action regarding new service requests from the wireless device when the threshold for IDLE/CONNECTED transactions is exceeded comprises denying new service requests from the UE.

4. The method of claim 1 wherein the service request throttling is performed at one of an eNodeB, a NodeB, a Wi-Fi access point and a multi-radio access technology (multi-RAT) access node.

5. The method of claim 1 wherein taking an action regarding new service requests from the wireless device when the threshold for a rate of service requests is exceeded comprises:
   permitting a mobile device to attach; and
   not permitting the mobile device to establish a data connection with the core network.

6. The method of claim 1 wherein taking an action regarding new service requests from the wireless device when the threshold for a rate of service requests is exceeded comprises:
   permitting a mobile device to attach; and
   permitting the mobile device to establish a data connection with the core network which is one of restricted, capped or has throttled bandwidth.

7. The method of claim 1 wherein throttling is put in place temporarily by a policy at a core network node.

8. The method of claim 1 wherein throttling permits a large number of users to send and receive urgent text messages in an emergency situation.

9. The method of claim 1 further comprising:
   flagging certain activities by a device as being anomalous;
   determining the device performing the certain activities is a rogue device; and
   disallowing a related attachment request from the rogue device.

10. The method of claim 1 wherein an activity is flagged as being anomalous when the activity includes at least one of:
    a number of attach or detach requests above a flooding threshold and within a certain time;
    a sequence of attach requests to more than one eNodeB within a certain time;
    a sequence of attach requests to the same eNodeB without completing the attach sequence within a certain time;
    a sequence of mobility registration requests within a certain time;
    unusual upload activity;
    unusual download activity;
    activity indicating a port scan of network resources; and
    activity on a particular set of ports previously identified as belonging to a rogue UE or anomalous node.

11. The method of claim 10 wherein determining the device performing the certain activities is a rogue device includes considering at least one of:
    an International Mobile Subscriber Identity (IMSI);
    an International Mobile Station Equipment Identity (IMEI);
    an operating system;
    an operating system version;
    a browser;
    a browser version;
    an application name;
    an application version;
    protocols at various layers; and
    an Internet Protocol (IP) address.

12. The method of claim 10 wherein the rogue device comprises one of a rogue eNodeB, a rogue base station, and a rogue relay node.

13. The method of claim 10 wherein detection of a rogue device is based on pattern matching.

14. The method of claim 10 wherein detection of a rogue device is based on deep packet inspection (DPI) heuristics, signatures, or rules.

* * * * *